Figures 1, 2:
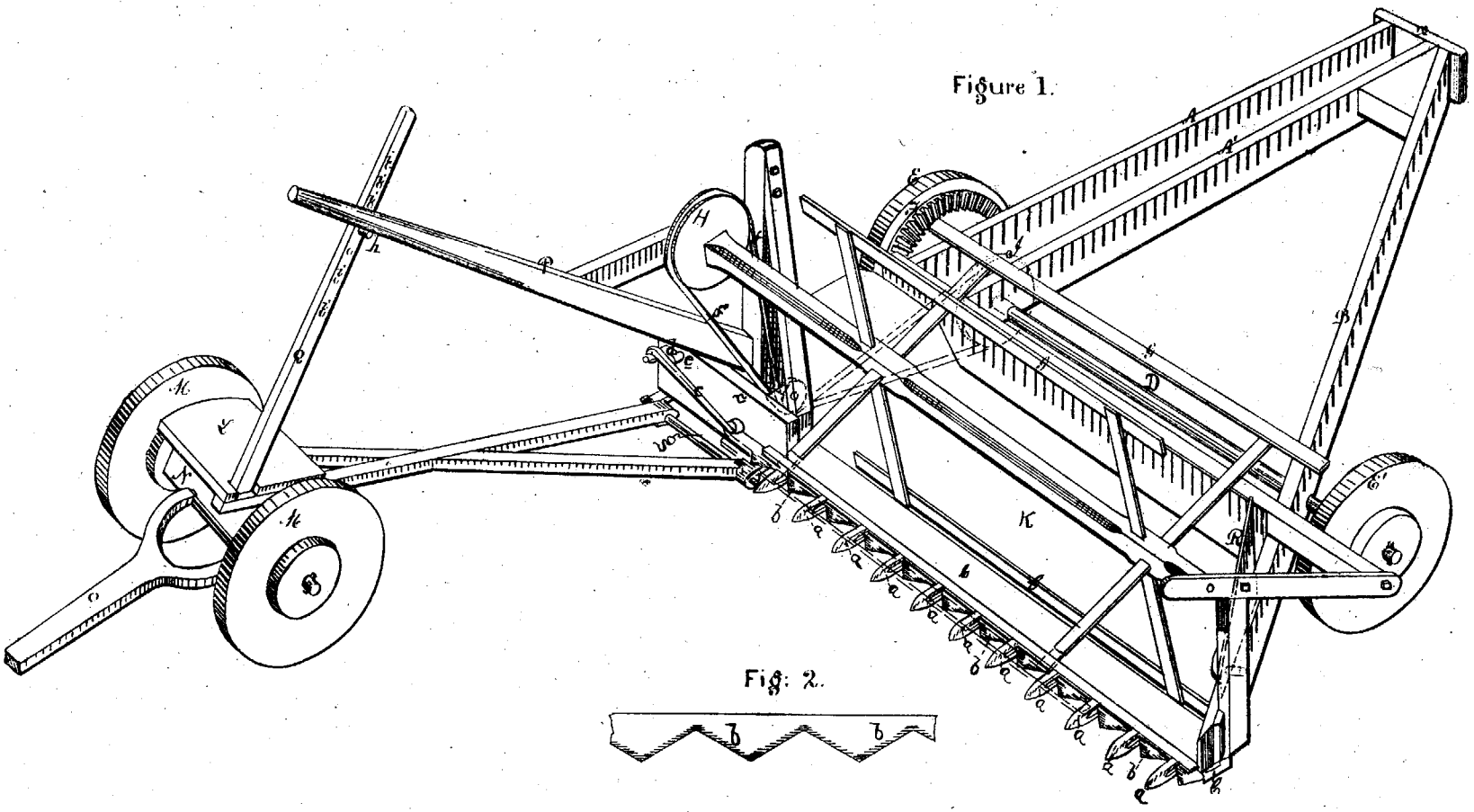

J. H. Manny.

Mower.

No 287 Reissued Jan 2. 1855

UNITED STATES PATENT OFFICE.

JOHN H. MANNY, OF ROCKFORD, ILLINOIS.

IMPROVEMENT IN THE ARRANGEMENT OF JOINTS FOR ATTACHING TRUCKS TO HARVESTER-FRAMES.

Specification forming part of Letters Patent No. 8,385, dated September 23, 1851; Reissue No. 287, dated January 2, 1855.

DIVISION B.

*To all whom it may concern:*

Be it known that I, JOHN H. MANNY, of Rockford, in the county of Winnebago and State of Illinois, formerly of Waddam's Grove, in the county of Stephenson and State aforesaid, have invented certain new and useful Improvements in Reaping and Mowing Machines, of which the following is a full, clear, and exact description, reference being had to the accompanying drawing, which forms part of this specification, and in which—

Figure 1 represents a view in perspective of my machine complete.

Reaping and mowing machines may be divided into numerous classes, according to certain peculiarities in their construction and mode of operation; but for the purpose of giving a clear idea of the nature and object of the improvement which is the subject of this patent it will be sufficient to divide them into two classes only, one in which the machines are rigid throughout their entire length and the other in which they have one or more joints which allow them to be flexed. The objection to the former class of machines is that they do not conform to the undulations of the surface of the ground sufficiently well to cut grass or grain at or near a uniform height, so that, while their cutters in passing across a depression will often be on a level with the top of the grass or grain growing therein, in crossing a ridge they will often cut into the ground, and a protruding stone or stump can only be passed without danger by going around it. The other class of machines, in consequence of being jointed, avoid many of these difficulties, but still as heretofore constructed they are very defective, for while they can be flexed to adjust their cutters at different distances from the ground, and can in a short time be raised or lowered to pass obstructions, yet in case the cutter should come in collision with an unobserved bowlder or like obstruction it will be injured or broken the same as if the machine were incapable of flexure, because when adjusted it is rigid for the time being, like those of the first division. To prevent this difficulty, some of this class of machines have been made with a free joint with a view to enable them to support their cutters, so as to conform at all times to the inequalities of the surface, and equally free to rise over protuberances and descend into depressions. This flexibility has proved highly advantageous, yet it was found that when the cutter met with any unusual resistance, as when it came in collision with a stone or stump, the draft, combining with the weight of the machine, would tend to depress the cutter, and thus keep it in contact with the obstruction, instead of tending to make it rise over and pass the same, so that the machine must either stop or break. Hence the flexibility of these machines, although useful, proved very inadequate for the purpose which it was designed to accomplish thereby. This failure of the joint to perform the function for which it was designed I discovered, after much thought and many experiments, resulted from its not being placed in the proper position; and I further found that when it was placed in the line of the front edge of the cutting apparatus, or thereabout, none of the difficulties before enumerated would occur. In this case the joint of the machine is constantly flexed downward, and the line of draft therefore has an upward inclination and tends to unflex or straighten, and of course to raise the cutter. This tendency to raise the cutter by the ordinary draft is nearly sufficient to neutralize the tendency of the machine to keep down by its own weight, so that in case of the collision of the machine with a stone, stump, or other obstruction the draft will raise the cutter, and thus greatly facilitate its passage over the same—a simple change in the position of the hinge thus producing a very great and important improvement in the machine.

The machine represented in the accompanying drawing, to which my improvements are applied, consists of two principal parts connected together by a hinged draft-bar. The first is a two-wheeled truck or leading-carriage, to which the horses are harnessed, and which carries the driver. The second is also a two-wheeled carriage, and it supports the cutter and gearing. This cutter-carriage consists of a pair of parallel side rails, A A′, connected by transverse bars *m* and *n*. These together constitute the frame which supports the driving-wheel and driving-gear. From the inner rail, A′, the bar C, which supports the cutter and the fingers, projects at right angles, and its outer extremity is held up by the end of the lever extending across to the rear end of the gear-frame and resting between its extremities upon an axle, D, on which the supporting-wheels E E′ turn. From this arrangement it will be seen that the outer end of the finger-bar is supported on the outer end of the lever B. This end of the lever, with the weight of the bar supported thereon, is counterbalanced and held up by the weight of the frame, to which its inner end is attached. As the gear-frame and the lever are both rigid and turn upon the axle as their common fulcrum, it follows that when, by the raising of the front end of the gear-frame, the inner end of the finger-bar and cutter is raised the rear end of the gear-frame and the rear end of the lever B will be depressed proportionately, and will raise in a corresponding degree the outer end of the finger-bar, so as to maintain it at the same elevation under all circumstances as the inner end, so far as rigidity in the frame can accomplish that object.

The front bar, C, of the frame sustains the cutting apparatus. This consists of a series of stationary fingers, *a a*, which project forward, and as the machine is advanced enter the standing grain, and of a reciprocating sickle-blade, *b*. The latter is serrated, as represented in the drawing, and its edges are sickled. The sickle is connected at one extremity by means of a rod, *c*, with the wrist of a crank, *d*, which is secured to the front extremity of the shaft *e*. This shaft extends backward toward the axle D, and carries at its hinder extremity a beveled pinion, whose teeth engage with those of a corresponding beveled wheel, F, secured to one of the running-wheels, E, so that the latter becomes the driving-wheel of the machine, and in running over the ground causes the crank-shaft to revolve and impart a reciprocating movement to the sickle-blade.

To facilitate the operation of the cutting apparatus, a reel, G, is employed to press the grass or grain toward the cutter and turn it over the bar upon the ground or a platform, as the case may be. The shaft of this reel turns upon bearings in the frame of the machine. It is fitted with a belt-pulley, H, which is encircled by a belt leading from a corresponding pulley, I, on the axle D, so that as the latter turns with the wheel E the reel is caused to revolve.

When the machine is arranged for cutting grain and is in operation the grain cut falls upon a platform, K, behind the cutting apparatus, and is raked off at the side of the machine by a person who stands upon the frame behind the platform.

In order to leave the side of the platform at which the grain is discharged perfectly free for the action of the rake, the belt *f*, by which motion is conveyed to the reel-shaft, is deflected from its direct course between the driving and leading pulleys I and H by passing it under guide-pulleys, which are pivoted to the frame of the machine beneath the front edge of the raking-platform.

The leading carriage, to which the team is harnessed, consists of a pair of wheels, M, an axle, N, a stand, L, for the driver, a tongue, hounds, &c., to harness the horses to, and a standard for aiding in maintaining the cutter at the proper height. The hinder extremity of the draft-bar, which in this example is forked, is connected by a horizontal bolt, *g*, with the finger-bar on the hinder carriage, so that this carriage can tilt or turn upon the axle D of its running-wheels without affecting the front axle-tree, N, to which the tongue O is secured. In order to control this tipping of the hinder carriage, and consequently to regulate the distance of its front rail and the cutting apparatus thereto attached from the ground, a strong bar or arm, P, projects from the frame of the hinder carriage over the frame of the front one, and moves up and down by the side of a standard, Q, erected upon the front part of the driving-platform on the forward carriage. The bar P may be held against the standard Q by a rectangular staple, which embraces the standard. This standard is perforated with a series of holes, *i*, to which a pin, *h*, is fitted that can be shifted from one hole to another. The projecting bar P is rigidly connected with the front part of the hinder-carriage frame, and hence when it is raised this portion of the carriage is correspondingly raised and the cutting apparatus is lifted from the ground. It is then prevented from lowering down again by passing the pin *h* through the standard in the hole immediately beneath the bar P. This pin, although it prevents the bar P, and consequently the front of the hinder carriage, from sinking too low, does not prevent it from rising when the finger-bar strikes any unobserved protuberance on the ground, and hence while this arrangement affords a convenient means of regulating the distance of the cutting apparatus from the ground it diminishes the risk from the breakage from collision with an unnoticed bowlder or other hard protuberance on the surface of the ground.

When this machine is used for cutting grain the driver stands upon the platform L of the front carriage, where he can drive the horses, observe the height of the grain, the nature of the surface of the ground, the position of obstructions, and can at the same time regulate the height of the cutter by raising or lowering the bar P, and with it the cutting apparatus, as circumstances may require.

The raker stands upon the frame of the hinder carriage, behind the raking-platform K, where he can readily rake off the grain falling thereon and discharge it at the side of the machine most distant from the standing grain.

When the machine is used for mowing grass or other substances which do not require to be bound into sheaves the platform is removed and the cut grass falls directly over the finger-bar and cutter upon the surface of the ground behind it and is left in the track or wake of the machine. As the cut grass falling at that side of the machine nearer the standing grass would be in the way of the team and wheels when making a succeeding cut, and would also be injured by being trampled, I secure an adjustable hinged guard-plate, R, to the inner side of the oblique lever B. When the raking-platform K is in use this guard-plate is turned up, as is represented in Fig. 1; but when the platform is removed this guard-plate is depressed and then turns the cut grass falling at that end of the cutting apparatus away from the standing grass, thus leaving a clear space for the wheels to run on and the team to walk in while making a succeeding cut.

Having thus described my improvement in reaping and mowing machines, what I claim therein as new, and desire to secure by Letters Patent, is—

The arrangement of a flexible joint in the line of the cutter, or thereabout, in such manner that the machine will bend freely up and down along this line to keep the cutter as nearly as may be at a uniform height from the surface of smooth or undulating ground.

In testimony whereof I have hereunto subscribed my name.

JOHN H. MANNY.

Witnesses:
P. H. WATSON,
F. G. DE FONTAINE.